(12) United States Patent
Wolfe, Jr. et al.

(10) Patent No.: US 9,901,075 B2
(45) Date of Patent: Feb. 27, 2018

(54) MOLDED PET TREAT DELIVERY SYSTEMS

(71) Applicants: Jerry J. Wolfe, Jr., Hutto, TX (US); Harold Keith Benson, Hutto, TX (US)

(72) Inventors: Jerry J. Wolfe, Jr., Hutto, TX (US); Harold Keith Benson, Hutto, TX (US)

(73) Assignee: Starmark Pet Products, Inc., Hutto, TX (US)

( * ) Notice: Subject to any disclaimer, the term of this patent is extended or adjusted under 35 U.S.C. 154(b) by 189 days.

(21) Appl. No.: 14/635,165

(22) Filed: Mar. 2, 2015

(65) Prior Publication Data

US 2016/0255813 A1    Sep. 8, 2016

(51) Int. Cl.
*A01K 5/00* (2006.01)
*A01K 15/02* (2006.01)
*A01K 5/01* (2006.01)

(52) U.S. Cl.
CPC ............. *A01K 15/026* (2013.01); *A01K 5/00* (2013.01); *A01K 5/0114* (2013.01); *A01K 15/025* (2013.01)

(58) Field of Classification Search
CPC ...... A01K 15/026; A01K 15/025; A01K 5/00; A01K 5/0114; A01K 7/005
See application file for complete search history.

(56) References Cited

U.S. PATENT DOCUMENTS

| D346,048 | S | 4/1994 | Jandebeur et al. |
|---|---|---|---|
| D412,606 | S | 8/1999 | Weinacker, Jr. |
| 6,050,224 | A | 4/2000 | Owens |
| 6,186,096 | B1 | 2/2001 | Miller |
| 6,601,539 | B1 | 8/2003 | Snook |
| 7,270,085 | B2 * | 9/2007 | Wolfe, Jr. ............ A01K 15/026 119/709 |
| 7,278,374 | B2 * | 10/2007 | Mann .................... A01K 15/026 119/51.03 |
| 7,389,748 | B2 | 6/2008 | Shatoff et al. |
| 7,591,234 | B2 | 9/2009 | Shatoff et al. |
| 7,810,455 | B2 | 10/2010 | Axelrod et al. |
| D634,080 | S | 3/2011 | Rutherford et al. |
| 8,141,521 | B2 | 3/2012 | Shatoff et al. |
| 8,516,977 | B2 | 8/2013 | Shatoff et al. |
| 8,701,598 | B1 | 4/2014 | Crabtree |
| D710,554 | S | 8/2014 | Byrne |
| 8,919,288 | B2 * | 12/2014 | Ressemann ............ A01K 13/00 119/61.5 |
| 9,078,411 | B2 * | 7/2015 | Simon ................... A01K 5/0114 |

(Continued)

FOREIGN PATENT DOCUMENTS

WO    20150169658 A1    11/2015

OTHER PUBLICATIONS

Starmark Pet Products, Inc., "Molded Pet Treat Delivery System", Application No. EP16158031.1, European Search Report dated Jan. 17, 2017.

*Primary Examiner* — Kristen C Hayes
(74) *Attorney, Agent, or Firm* — Russell Ng PLLC; Brian F. Russell

(57) ABSTRACT

An animal treat delivery system includes a frame and a rod. The frame has a wall generally enclosing or bounding an area. The wall has an interior surface, an exterior surface, a top, and a bottom. The rod, which has at least one free end, is supported within the area by the interior surface of the wall at a position intermediate the top and the bottom of the wall.

21 Claims, 10 Drawing Sheets

(56) References Cited

U.S. PATENT DOCUMENTS

| | | | |
|---|---|---|---|
| 2002/0185073 A1* | 12/2002 | Fullerton | A01K 5/01 119/51.01 |
| 2006/0048718 A1 | 3/2006 | Mann | |
| 2006/0060154 A1 | 3/2006 | Wesely | |
| 2006/0213454 A1 | 9/2006 | Wolfe, Jr. et al. | |
| 2008/0121190 A1 | 5/2008 | Moulton | |
| 2009/0078214 A1* | 3/2009 | Mann | A01K 15/026 119/709 |
| 2009/0126641 A1* | 5/2009 | Anderson | A01K 5/0135 119/61.5 |
| 2012/0048212 A1* | 3/2012 | Konovalov | A01K 27/009 119/718 |
| 2012/0090556 A1 | 4/2012 | Rosa | |
| 2012/0272921 A1 | 11/2012 | Santarsiero | |
| 2013/0008389 A1 | 1/2013 | Teconchuk et al. | |
| 2013/0092097 A1 | 4/2013 | Cooper | |
| 2013/0104811 A1 | 5/2013 | Teconchuk et al. | |
| 2013/0118417 A1 | 5/2013 | Teconchuk et al. | |
| 2013/0125823 A1* | 5/2013 | Simon | A01K 5/0135 119/61.5 |
| 2014/0060442 A1* | 3/2014 | Ressemann | A01K 13/00 119/61.5 |
| 2014/0165920 A1* | 6/2014 | Sarty | A01K 7/005 119/72 |
| 2014/0209038 A1 | 7/2014 | Simon | |

\* cited by examiner

MOLDED PET TREAT DELIVERY SYSTEMS

BACKGROUND OF THE INVENTION

The present invention relates to articles of manufacture and associated methods, and more specifically, to articles such as pet treats and molded pet toys that function as pet treat delivery systems and associated methods of manufacture and use.

It is well known in the art that boredom is a significant contributor to destructive behavior in domesticated animals. For example, U.S. Pat. No. 6,634,318 to Rucker and the prior art referenced therein discloses that barking, digging and other destructive behaviors are common problem behaviors of canines that become discontented or bored. As further disclosed in these patents, one common approach utilized in the art to address such destructive behaviors in dogs is to provide a toy with which the dog can interact and that encourages such interaction by rewarding the dog. For example, one class of dog toys dispense food (e.g., treats) from a hollow interior cavity through an opening as a dog interacts with the toy. The Rucker dog toy utilized an edible closure, a portion of which extended outside of the toy, to initially prevent treats from escaping through an opening in the toy. As a dog broke the edible closure, the edible closure dislodged from the opening to allow treats to readily exit the Rucker dog toy.

BRIEF SUMMARY

The present disclosure appreciates that pet toys that function as pet treat delivery systems may reduce destructive behavior of a pet only during a time period in which the pet remains interested in the pet toy. The present disclosure also appreciates that a pet may quickly loose interest in a pet toy when the pet toy no longer includes pet treats.

In at least one embodiment, an animal treat delivery system includes a frame and a rod. The frame has a wall at least substantially enclosing an area. The wall has an interior surface, an exterior surface, a top, and a bottom. The rod, which has at least one free end, is supported within the area by the interior surface of the wall at a position intermediate the top and the bottom of the wall.

In various embodiments, the frame and the rod are molded from a nylon material. In at least one embodiment, wall may be a continuous wall, and the continuous wall may have at least one opening formed therein.

In at least one embodiment, the system further comprises one or more animal digestible treats each including a hole that is sized such that the animal digestible treats are slidably received on the rod at the at least one free end.

In another embodiment, the wall is open at one of the top and the bottom. In a different embodiment, the wall is open at both the top and the bottom. In various embodiments, the wall may be shape suggestive of or similar to a donut or tire, a light bulb, a bone, a rectangle, a square, a horseshoe, a jack, an oval, a circle, a fish, or a squiggle, among other forms.

In at least one embodiment, a diameter of the rod is between about fifteen millimeters, a height of the wall is between about forty-five to fifty-seven millimeters, and an outer diameter of the treat is about thirty-five millimeters. In one or more embodiments, the rod has two free ends. In at least one embodiment, the multiple rods are employed. In another embodiment, the rod is centrally positioned between the top and the bottom. In yet another embodiment, the frame and the rod combined weigh between about one-hundred forty and two-hundred ten grams.

DETAILED DESCRIPTION

Disclosed herein are innovative articles, such as pet treats and pet toys that function as pet treat delivery systems, as well as associated methods of manufacture and use. In one embodiment described in detail herein, animal digestible pet treats are loaded onto and retained on a rod extending from a frame that includes a wall generally enclosing an area. The configuration of the wall and the relative sizing of the wall and animal digestible treats permits the animal digestible pet treats to be loaded onto and retained on the rod until a pet dislodges the treats (e.g., by licking or biting the treats). The general construction of the pet toy serves to increase a time in which animal digestible treats are retained within an interior of the pet toy and, as such, increases the time in which a pet may remain interested in the pet toy.

Figure 1:
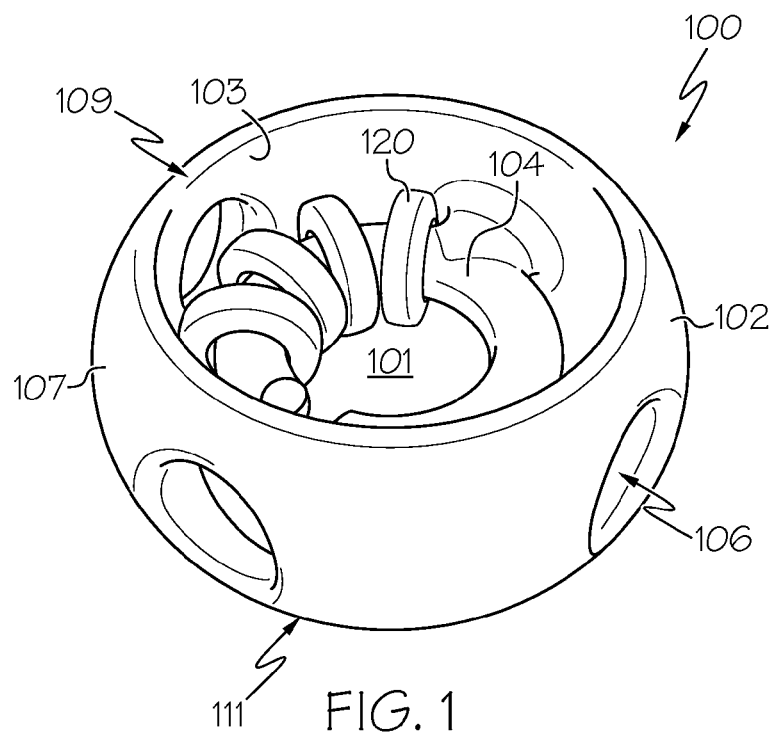
FIG. 1 is a perspective view of an animal treat delivery system (having a donut or tire shape) that includes a frame (with a wall that includes three holes) and a rod that is configured to retain one or more animal digestible treats in accordance with one embodiment.
Figure 2:
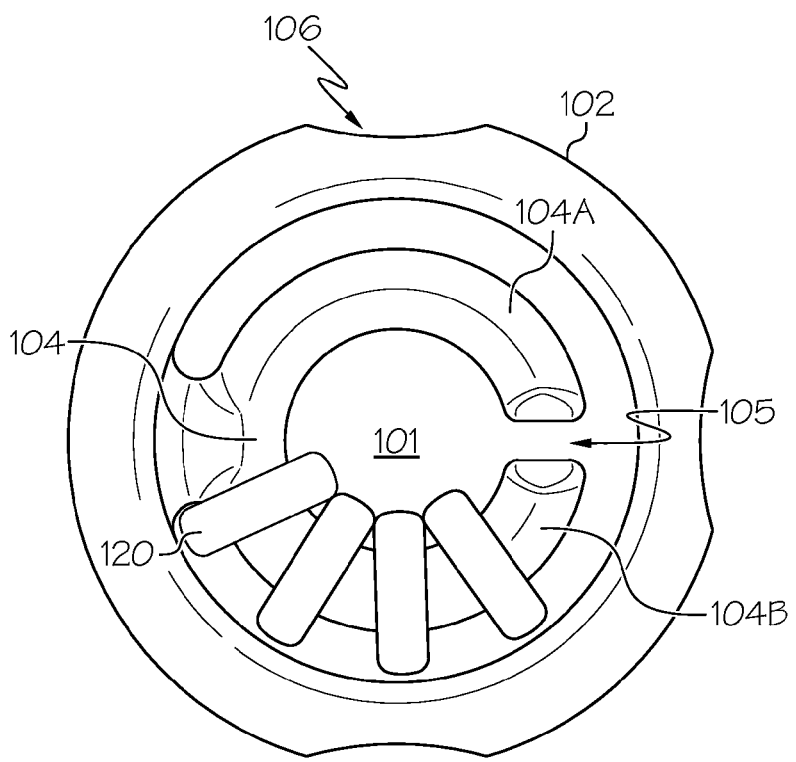
FIG. 2 is a top view of the animal treat delivery system of FIG. 1 further illustrating the rod, which includes a gap sized to facilitate loading the animal digestible treats on two free ends of the rod.

With reference to FIGS. 1 and 2, an animal treat delivery system 100 is illustrated that is configured according to one embodiment of the present disclosure. Animal treat delivery system 100 includes a frame 102 having a wall generally enclosing an area 101. The wall, which in this embodiment is continuous, is defined by an interior surface 103, exterior surface 107, top 109, and bottom 111. In the specific embodiment given in FIGS. 1-2, the continuous wall has a generally circular, ovoid, or rounded shape. In other embodiments, the wall may have one or more discontinuities, but still bounds an area. In some embodiments, the wall is between about 3 and 12 millimeters thick, and more preferably between 3 and 10 millimeters thick. Still more preferably, the wall is between four and six millimeters thick. As will be appreciated, the thickness of the wall can be selected from among these ranges (or outside these ranges) based, for example, on the material from which frame 102 is made, the desired rigidity of frame 102, and the type and size of animal for which the animal treat delivery system 100 is intended. In one or more embodiments, frame 102 is molded from a rigid material, such as nylon or acrylonitrile butadiene styrene (ABS).

Animal treat delivery system 100 further includes a rod 104, which is supported within area 101 at a position intermediate top 109 and bottom 111 of the wall by interior surface 103 of the wall. Although not required, in a preferred embodiment, rod 104 is formed integrally with frame 102 of like material. As is illustrated, rod 104 has one or more (and in this embodiment, two) free ends defining a first part 104A of rod 104 and a second part 104B of rod 104, which are separated by a gap 105. As illustrated best in FIG. 2, the free ends of rod 104 and gap 105 are configured to permit animal digestible treats 120 to be received on first part 104A and second part 104B of rod 104. For example, the ends of rod 104 are tapered and spaced to permit animal digestible treats 120 to be forced onto rod 104 by the application of human manual force without animal digestible treats 120 being able to fall off of rod 104 as the animal digestible treats 120 slide along rod 104 between first part 104A and second part 104B.

In the depicted embodiment, animal digestible treats 120 each include a through hole sized such that the animal digestible treats 120 can receive rod 104 through the hole and freely slide along the length of rod 104. In one or more embodiments, animal digestible treats 120 can be donut or tire-shaped, and rod 104 can have a generally circular cross-section, as shown. In other embodiments, rod 104, animal digestible treats 120, and the holes through animal digestible treats 120 may have cross-sectional shapes other than circular (e.g., square, rectangular, hexagonal, star, irregular, etc.). In one embodiment, animal digestible treats 120 have an outer diameter between about 25 to 35 millimeters and a width between about 10 and 15 millimeters.

In various embodiments, at least one of top 109 and bottom 111 (and in preferred embodiments, both of top 109 and bottom 111) of frame 102 is/are open to facilitate loading of animal digestible treats 120 on rod 104 and to permit an animal to access animal digestible treats 120. The animal can have further access to animal digestible treats 120, and particularly sufficient access to lick animal digestible treats 120 but not to bite or gnaw animal digestible treats 120, through one or more (in this case, three) holes 106 through frame 102.

Figure 3:
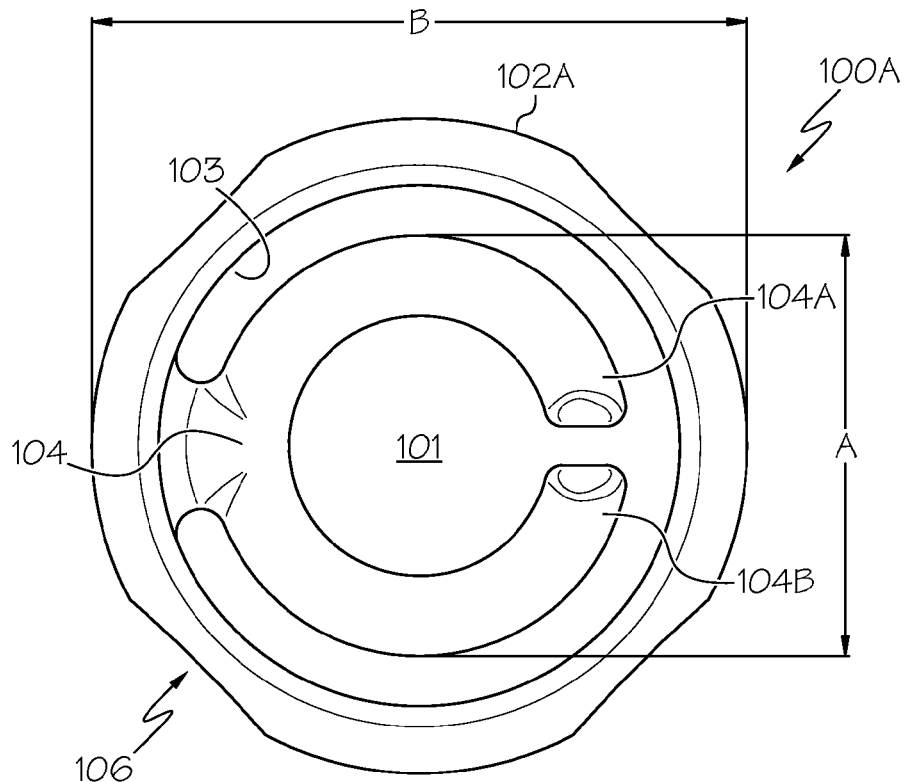
FIG. 3 is a top view of an animal treat delivery system (having a donut or tire shape) that includes a frame (with a wall that includes four holes) and a rod that is configured to retain one or more animal digestible treats in accordance with another embodiment.
Figure 4:
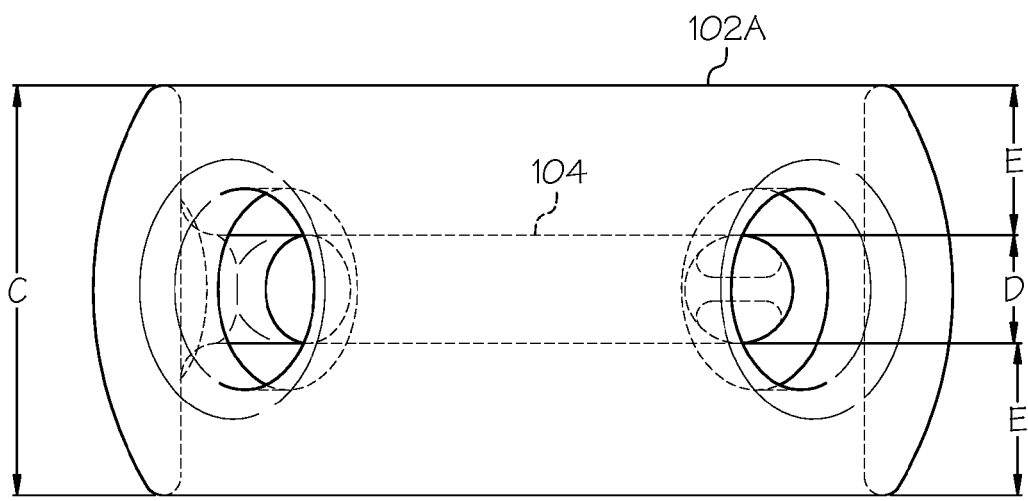
FIG. 4 is a side view of the animal treat delivery system of FIG. 3.

With reference to FIGS. 3 and 4 an animal treat delivery system 100A is illustrated that is configured according to another embodiment of the present disclosure. Animal treat delivery system 100A is substantially the same as animal treat delivery system 100, with the exception that frame 102A of animal treat delivery system 100A includes four (instead of three) holes 106. The design of animal treat delivery system 100A is characterized by dimensions A, B, C, D and E, which respectively correspond to the outer dimension of rod 104, the outer dimension of frame 102A, the height of frame 102, the height of rod 104, and the spacing of rod 104 between top 109 and bottom 111. When animal treat delivery system 100A is intended for use by dogs the following dimensions may be employed. Rod 104 may have an outer dimension A of between 50 and 100 millimeters and, more preferably, between 60 and 90 millimeters. Still more preferably, dimension A is between 70-80 mm and is, yet more particularly, is about 78 mm. Outer dimension B is between 90-150 mm, and more preferably, between 100-140 mm. Still more preferably, dimension B is between 110-130 mm, and yet more particularly, about 120 mm. Dimension C is preferably between 35-70 mm, and more preferably, between 45-65 mm. Still more preferably, dimension C is between 50-60 mm, and yet more particularly, about 57 mm. Dimension D is preferably between 10-20 mm and more preferably about 15 mm. Dimension E is preferably between 10-30 mm and, more preferably, about 21 mm. Given the most preferred dimensions, an animal treat delivery system 100A formed of nylon will have a weight (exclusive of animal digestible treats 120) of about 188 grams.

It should be appreciated that in some embodiments, rod 104 is not centrally positioned between top 109 and bottom 111, enabling animal treat delivery system 100A to present differing degrees of difficulty in accessing animal digestible treats 120 from top 109 and bottom 111. It should further should be appreciated that the dimensions and weight of an animal treat delivery system, configured according to the present disclosure, may be different than the disclosed dimensions and still fall within the scope of the appended claims. However, dimension C of frame 102, the position of rod 104 along the height of frame 102A, the dimensions of animal digestible treats 120, the distance between rod 104 and interior surface 103 of frame 102, and other dimensions of animal treat delivery system 100A are preferably all selected to achieve a combination of dimensions that provides an animal for which animal treat delivery system 100A is intended limited access to animal digestible treats 120 loaded on rod 104 (e.g., via licking and/or incisal gnawing), but does not permit the animal to quickly crush or chew animal digestible treats 120. In this manner, animal engagement with animal treat delivery system 100A is prolonged.

Figure 5:
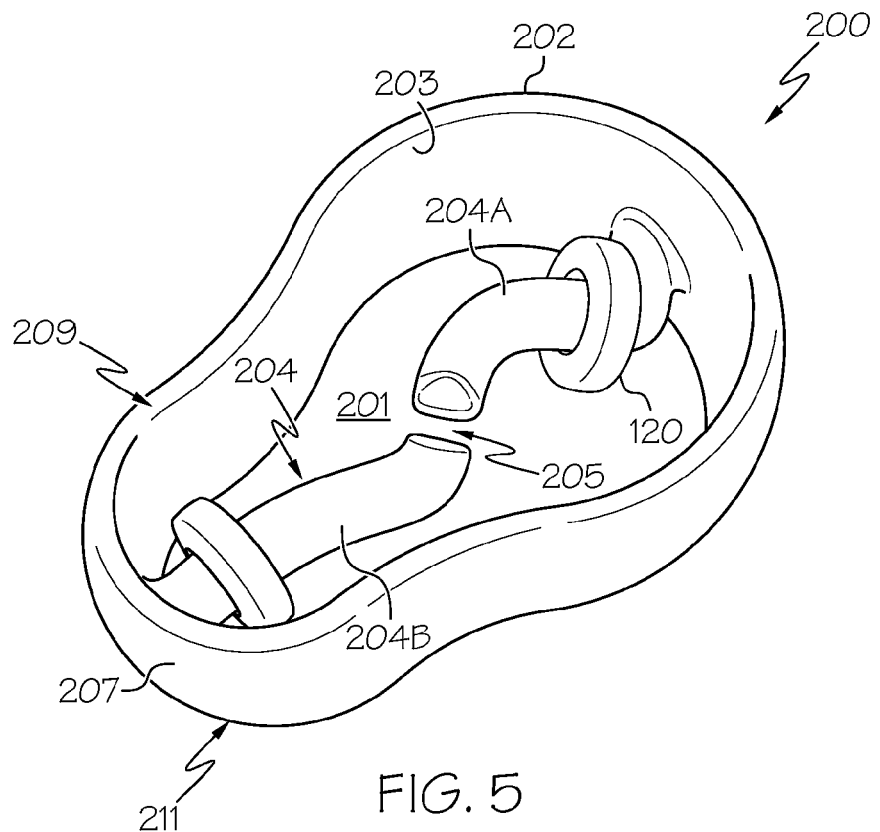
FIG. 5 is a perspective view of an animal treat delivery system (having a light bulb shape) that includes a frame (with a wall that does not include any holes) and a rod that is configured to retain one or more animal digestible treats in accordance with another embodiment.
Figure 6:
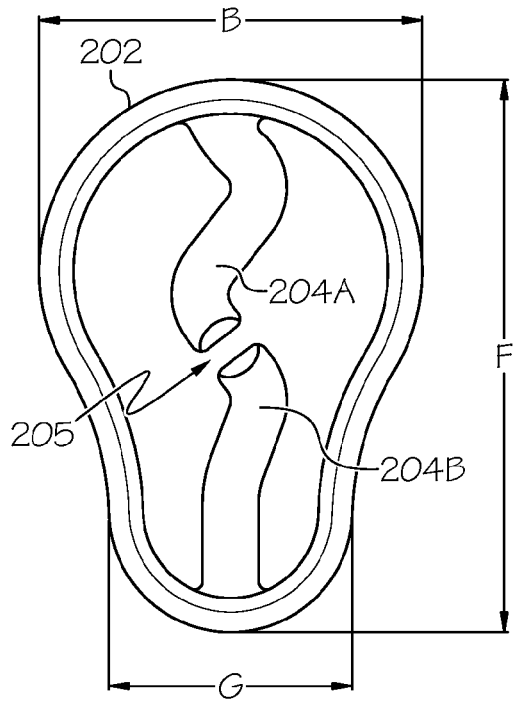
FIG. 6 is a top view of the animal treat delivery system of FIG. 5 further illustrating the rod, which includes a gap sized to facilitate loading animal digestible treats on two free ends of the rod.
Figure 7:
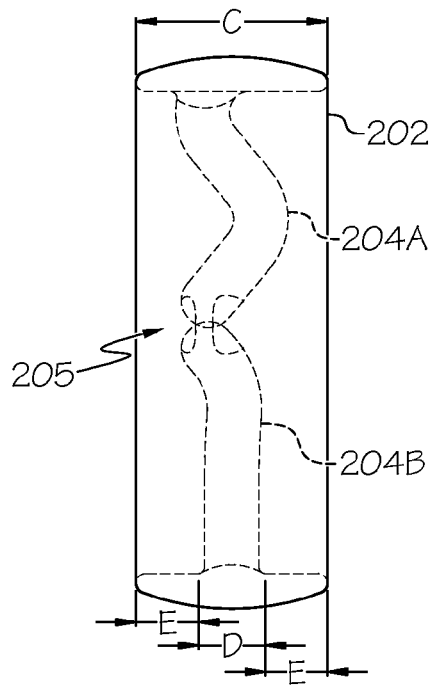
FIG. 7 is a side view of the animal treat delivery system of FIG. 6.

With reference to FIGS. 5-7, an animal treat delivery system 200 is illustrated that is configured according to another embodiment of the present disclosure. For ease of understanding, reference numerals corresponding to those utilized in FIGS. 1-4 are employed in FIGS. 5-7 to identify corresponding features of animal treat delivery system 200, with the exception that the reference numerals employed in FIGS. 5-7 begin with the numeral "2" rather than numeral "1". Animal treat delivery system 200, which can be made of the same or similar material and of the same or similar thickness as animal treat delivery systems 100, 100A of FIGS. 1-4, includes a frame 202 having a continuous wall enclosing or bounding an area 201 and a rod 204 supported within area 201 by an interior surface 203 of the continuous wall at a position intermediate top 209 and bottom 211 of the continuous wall. Frame 202 has an overall shape generally suggestive of a conventional incandescent light bulb or pear.

In the embodiment illustrated in FIG. 5, rod 204 again includes a first part 204A having a first free end and a second part 204B having a second free end separated from the first free end by a gap 205. The size of gap 205 and the tapering of the free ends of rod 204 permit animal digestible treats 120 to be mounted on rod 204 by manual force without the animal digestible treats 120 being able to fall off while sliding along rod 204 between first part 204A and second part 204B. It should be noted that in some embodiments, the length of first part 104A, 204A and second part 104B, 204B, the dimensions of rod 104, 204, and the material (e.g., nylon) from which rod 104, 204 is formed impart such rigidity to such that the force required to install animal digestible treats 120 on rod 104, 204 can be greater than is desirable. In such embodiments, the manual force required to install an animal digestible treat 120 on rod 104, 204 can be decreased by forming rod 104, 204 of a combination of materials. For example, rod 204 can be formed partially (i.e., near the first and second free ends) or fully of a rigid core (e.g., nylon or ABS) surrounded by a more resilient material, such as an elastomer (e.g., thermoplastic elastomer (TPE)). In this manner, the ends of rod 104, 204 can be more easily deflected or deformed to permit installation of animal digestible treats 120.

As shown in FIGS. 6 and 7, frame 202 is characterized by greater and lesser width dimensions B and G, a length dimension F, height dimension C, rod dimension D and rod spacing dimension E. When animal treat delivery system 200 is intended for use by dogs the following exemplary dimensions may be employed. Outer dimension B may be between 80-120 mm, and more preferably, between 90-110 mm. Still more preferably, dimension B is between 95-105 mm, and yet more particularly, about 100 mm. Outer dimension G may be between 60-100 mm, and more preferably, between 70-90 mm. Still more preferably, dimension G is between 70-90 mm, and yet more particularly, about 90 mm. Height dimension C is preferably between 35-70 mm, and more preferably, between 45-55 mm. Still more preferably, dimension C about 50 mm. Dimension D is preferably between 10-20 mm and more preferably about 15 mm. Dimension E is preferably between 10-30 mm and, more preferably, about 18 mm. Given the most preferred dimensions, an animal treat delivery system 200 formed of nylon will have a weight (exclusive of animal digestible treats 120) of about 182 grams.

Figure 8:
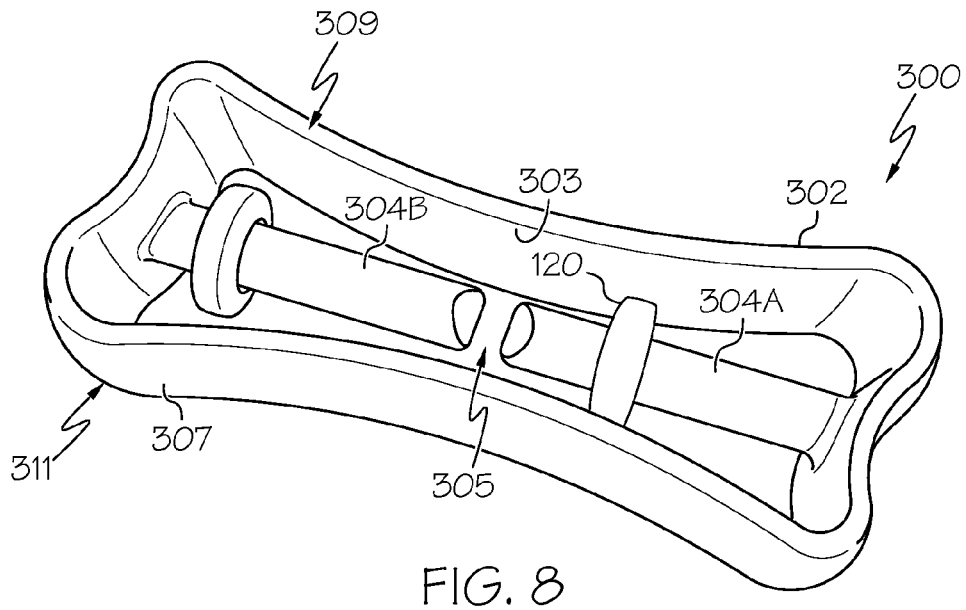
FIG. 8 is a perspective view of an animal treat delivery system (having a bone shape) that includes a frame (with a wall that does not include any holes) and a rod that is configured to retain one or more animal digestible treats in accordance with another embodiment.
Figure 9:
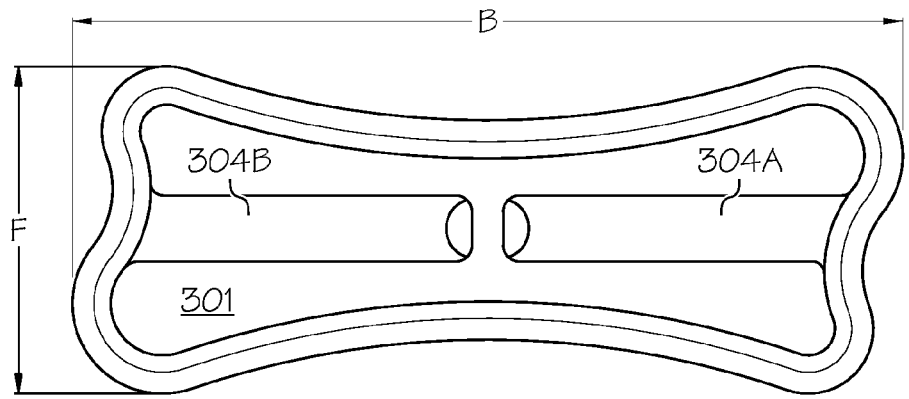
FIG. 9 is a top view of the animal treat delivery system of FIG. 8 further illustrating the rod, which includes a gap sized to facilitate loading animal digestible treats on two free ends of the rod.
Figure 10:
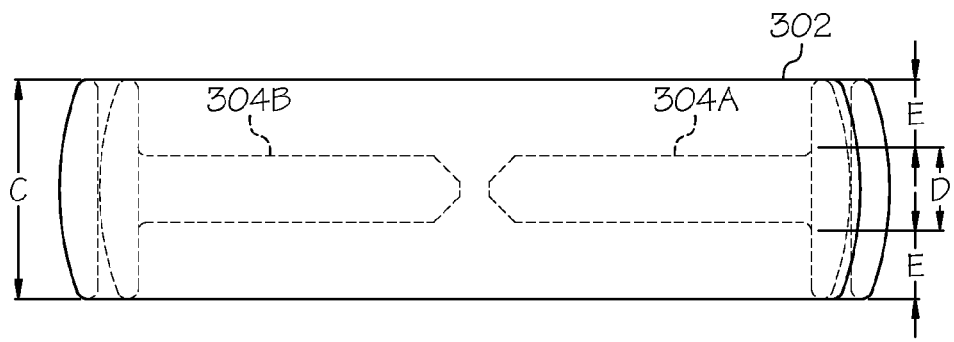
FIG. 10 is a side view of the animal treat delivery system of FIG. 9.

With reference to FIGS. 8-10, an animal treat delivery system 300 is illustrated that is configured according to another embodiment of the present disclosure. For ease of understanding, reference numerals corresponding to those utilized in FIGS. 1-7 are employed in FIGS. 8-10 to identify features corresponding to the previously described animal treat delivery systems, with the exception that the reference numerals employed in FIGS. 8-10 begin with the numeral "3". Animal treat delivery system 300, which can be made of the same or similar material and of the same or similar thickness as the previously described animal treat delivery systems, includes a frame 302 having a continuous wall enclosing or bounding an area 301 and a rod 304 supported within area 301 by an interior surface 303 of the continuous wall at a position intermediate top 309 and bottom 311 of the continuous wall. Frame 302 has an overall shape generally suggestive of a dog bone.

As illustrated in FIGS. 9 and 10, frame 302 is characterized by length dimension B, a width dimension F, height dimension C, rod dimension D and rod spacing dimension E. When animal treat delivery system 300 is intended for use by dogs the following exemplary dimensions may be employed. Length dimension B may be between 120-250 mm, and more preferably, between 160-220 mm. Still more preferably, dimension B is between 180-200 mm, and yet more particularly, about 190 mm. Width dimension F may be between 50-100 mm, and more preferably, between 70-80 mm. Still more preferably, dimension F is about 75 mm. Height dimension C is preferably between 35-70 mm, and more preferably, between 45-55 mm. Still more preferably, dimension C about 50 mm. Dimension D is preferably between 10-20 mm and more preferably about 15 mm. Dimension E is preferably between 10-30 mm and, more preferably, about 18 mm. Given the most preferred dimensions, an animal treat delivery system 300 formed of nylon will have a weight (exclusive of animal digestible treats 120) of about 195 grams.

Figure 11:
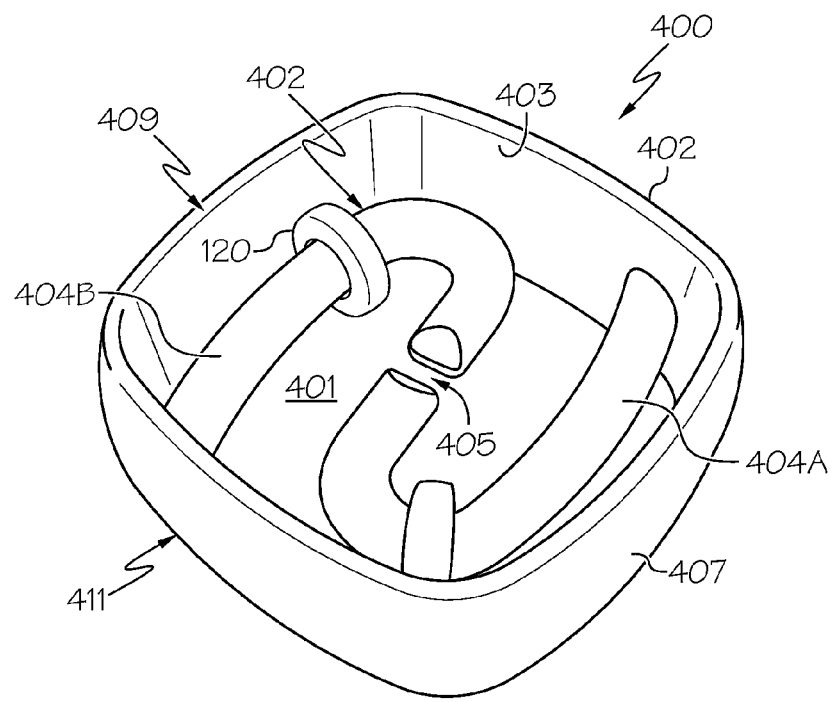
FIG. 11 is a perspective view of an animal treat delivery system (having a generally square/rectangle shape) that includes a frame (with a wall that does not include any holes) and a rod that is configured to retain one or more animal digestible treats in accordance with another embodiment.
Figures 12, 13:
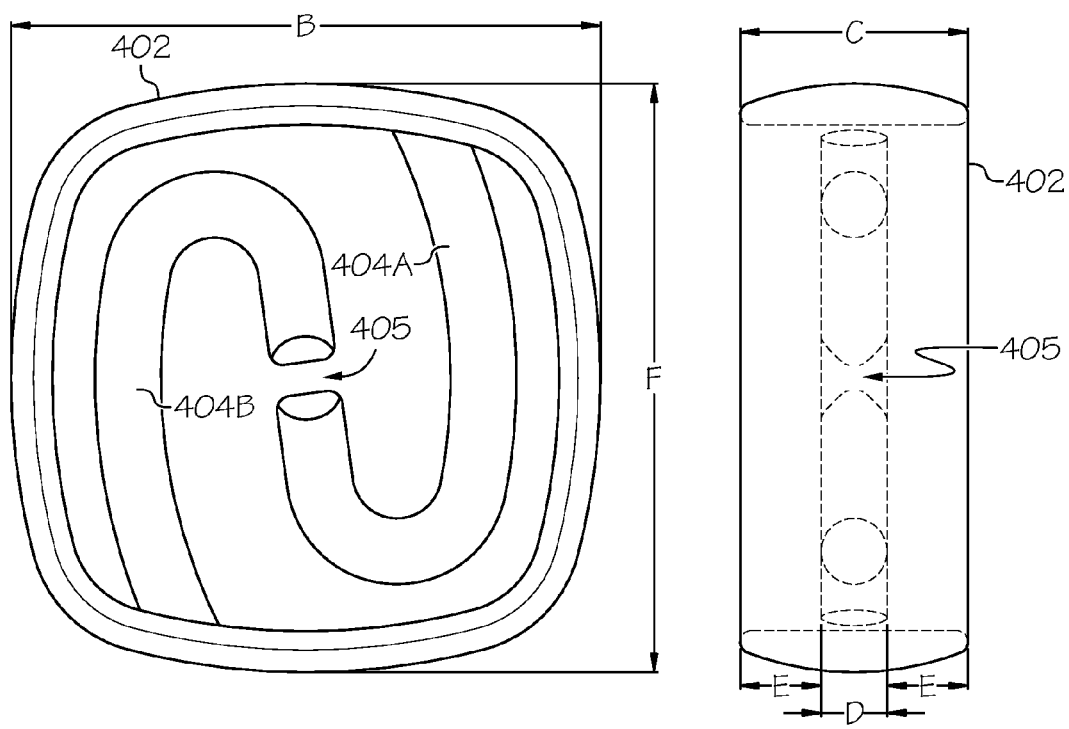
FIG. 12 is a top view of the animal treat delivery system of FIG. 11 further illustrating the rod, which includes a gap sized to facilitate loading animal digestible treats on two free ends of the rod.
FIG. 13 is a side view of the animal treat delivery system of FIG. 12.

With reference to FIGS. 11-13, an animal treat delivery system 400 is illustrated that is configured according to another embodiment of the present disclosure. For ease of understanding, reference numerals corresponding to those utilized in FIGS. 1-10 are employed in FIGS. 11-13 to identify features corresponding to the previously described animal treat delivery systems, with the exception that the reference numerals employed in FIGS. 11-13 begin with the numeral "4". Animal treat delivery system 400, which can be made of the same or similar material and of the same or similar thickness as the previously described animal treat delivery systems, includes a frame 402 having a continuous wall enclosing an area 401 and a rod 404 supported within area 401 by an interior surface 403 of the continuous wall at a position intermediate top 409 and bottom 411 of the continuous wall. Frame 402 has an overall shape generally that of a rounded square or rectangle.

As depicted in FIGS. 12 and 13, frame 402 is characterized by length dimension B, a width dimension F, height dimension C, rod dimension D and rod spacing dimension E. When animal treat delivery system 300 is intended for use by dogs the following exemplary dimensions may be employed. Length and width dimension B and F may be between 90-170 mm, and more preferably, between 110-150 mm. Still more preferably, dimensions B and F are between 120-140 mm, and yet more particularly, about 130 mm. Height dimension C is preferably between 35-70 mm, and more preferably, between 45-55 mm. Still more preferably, dimension C about 50 mm. Dimension D is preferably between 10-20 mm and more preferably about 15 mm. Dimension E is preferably between 10-30 mm and, more preferably, about 18 mm. Given the most preferred dimensions, an animal treat delivery system 400 formed of nylon will have a weight (exclusive of animal digestible treats 120) of about 190 grams.

Figure 14:
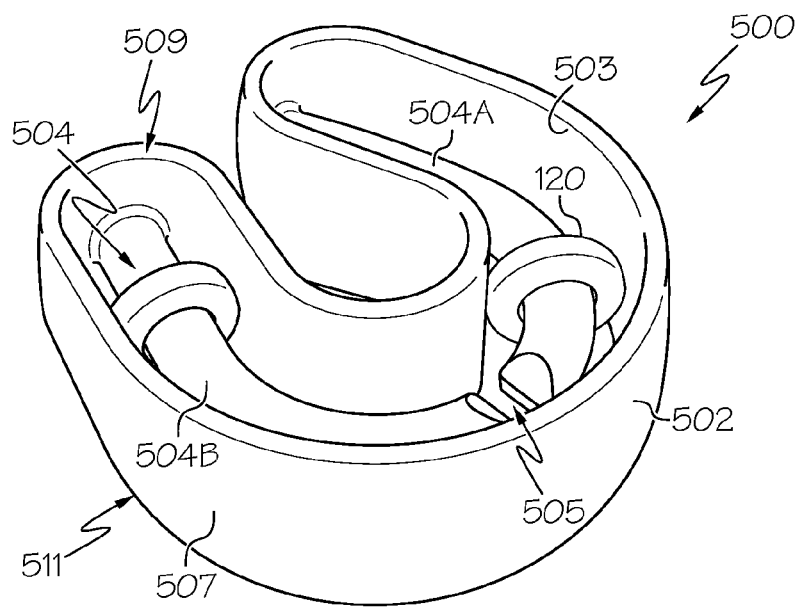
FIG. 14 is a perspective view of an animal treat delivery system (having a horseshoe shape) that includes a frame (with a wall that does not include any holes) and a rod that is configured to retain one or more animal digestible treats in accordance with another embodiment.
Figure 15:
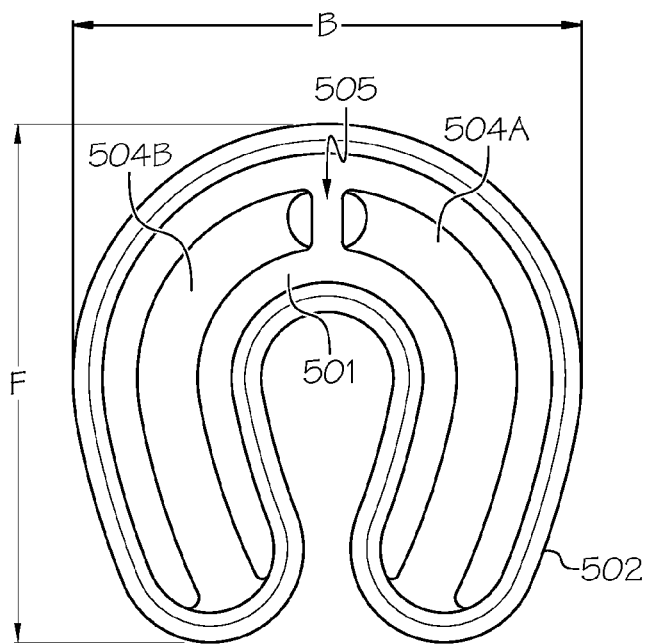
FIG. 15 is a top view of the animal treat delivery system of FIG. 14 further illustrating the rod, which includes a gap sized to facilitate loading animal digestible treats on two free ends of the rod.
Figure 16:
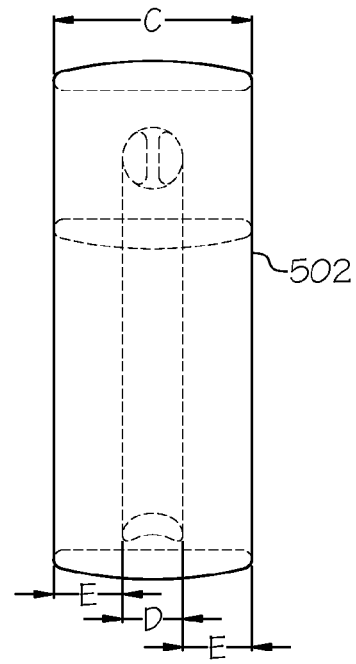
FIG. 16 is a side view of the animal treat delivery system of FIG. 15.

Referring now to FIGS. 14-16, an animal treat delivery system 500 is illustrated that is configured according to another embodiment of the present disclosure. In FIGS. 14-16, reference numerals corresponding to those utilized in FIGS. 1-13 are employed to identify features corresponding to the previously described animal treat delivery systems, with the exception that the reference numerals employed in FIGS. 14-16 begin with the numeral "5". Animal treat delivery system 500, which can be made of the same or similar material and of the same or similar thickness as the previously described animal treat delivery systems, includes a frame 502 having a continuous wall enclosing or bounding an area 501 and a rod 504 supported within area 501 by an interior surface 503 of the continuous wall at a position intermediate top 509 and bottom 511 of the continuous wall. Frame 502 has an overall shape generally that of a horseshoe.

As depicted in FIGS. 15 and 16, frame 502 is characterized by length dimension B, a width dimension F, height dimension C, rod dimension D and rod spacing dimension E. When animal treat delivery system 300 is intended for use by dogs the following exemplary dimensions may be employed. Length and width dimension B and F may be between 90-160 mm, and more preferably, between 100-150 mm. Still more preferably, dimensions B and F are between 120-130 mm, and yet more particularly, about 125 mm. Height dimension C is preferably between 35-70 mm, and more preferably, between 45-55 mm. Still more preferably, dimension C about 50 mm. Dimension D is preferably between 10-20 mm and more preferably about 15 mm. Dimension E is preferably between 10-30 mm and, more preferably, about 16.5 mm. Given the most preferred dimensions, an animal treat delivery system 500 formed of nylon will have a weight (exclusive of animal digestible treats 120) of about 194 grams.

Figure 17:
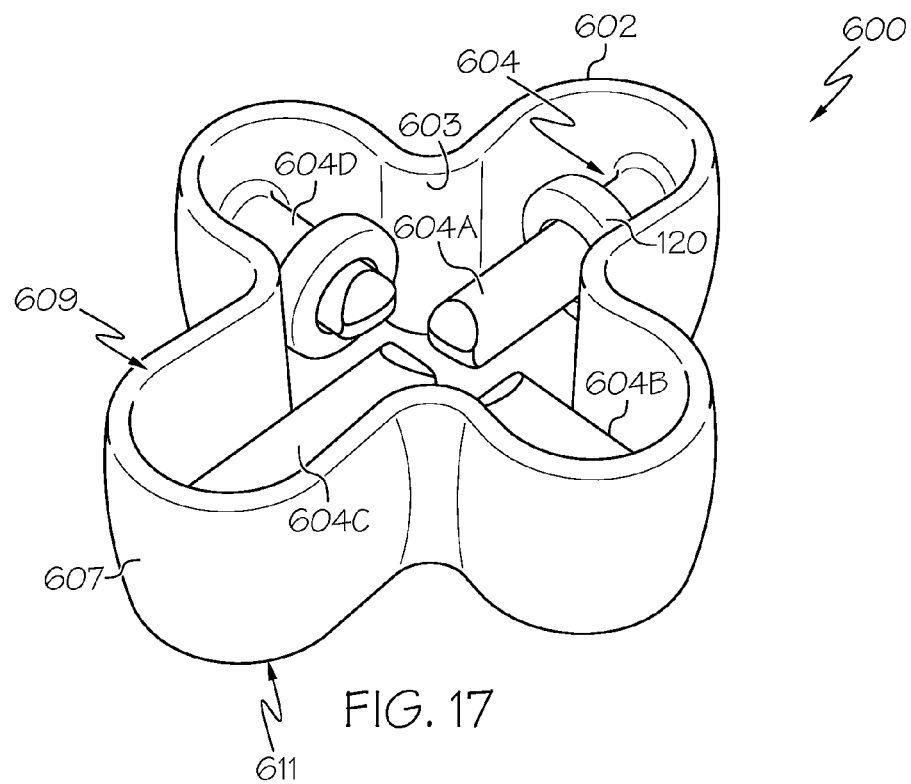
FIG. 17 is a perspective view of an animal treat delivery system (having a jack shape) that includes a frame (with a wall that does not include any holes) and a rod that is configured to retain one or more animal digestible treats in accordance with another embodiment.
Figure 18:
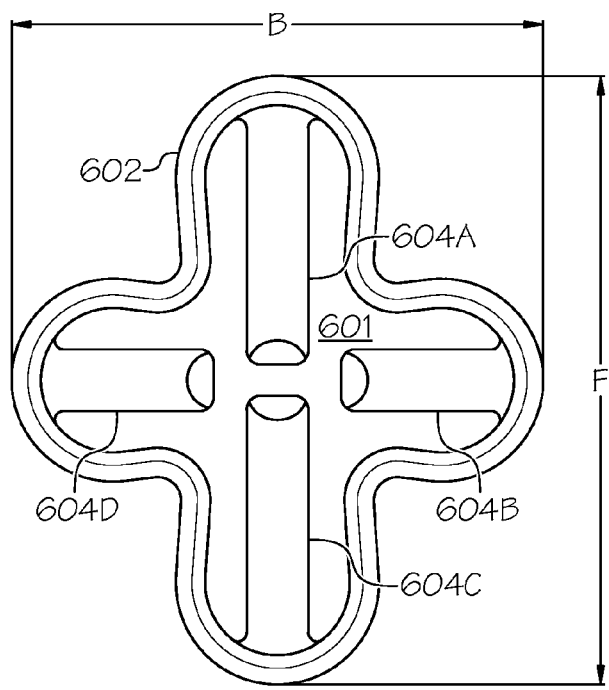
FIG. 18 is a top view of the animal treat delivery system of FIG. 17 further illustrating the rod, which includes a gap sized to facilitate loading animal digestible treats on four free ends of the rod.
Figure 19:
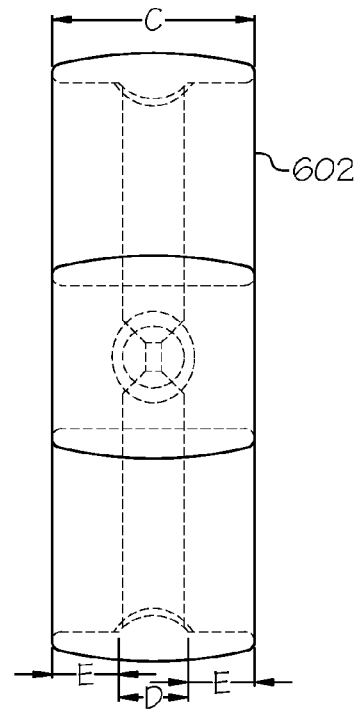
FIG. 19 is a side view of the animal treat delivery system of FIG. 18.

With reference to FIGS. 17-19, an animal treat delivery system 600 is illustrated that is configured according to yet another embodiment. In FIGS. 17-19, reference numerals corresponding to those utilized in FIGS. 1-16 are employed to identify features corresponding to the previously described animal treat delivery systems, with the exception that the reference numerals employed in FIGS. 17-19 begin with the numeral "6". Animal treat delivery system 600, which can be made of the same or similar material and of the same or similar thickness as the previously described animal treat delivery systems, includes a frame 602 having a continuous wall enclosing or bounding an area 601 and two rods 604 supported within area 601 by an interior surface 603 of the continuous wall at a position intermediate top 609 and bottom 611 of the continuous wall. The first of rods 604 includes first and second parts 604A-604B, and the second of the rods 604 includes third and fourth parts 604C-604D. Frame 602 has an overall shape generally that of a jack or cross.

As depicted in FIGS. 18 and 19, frame 602 is characterized by length dimension B, a width dimension F, height dimension C, rod dimension D and rod spacing dimension E. When animal treat delivery system 600 is intended for use by dogs the following exemplary dimensions may be employed. Length dimension B may be between 90-160 mm, and more preferably, between 110-140 mm. Still more preferably, dimension B is between 120-130 mm, and yet more particularly, about 126 mm. Width dimension F may be between 100-200 mm, and more preferably, between 120-170 mm. Still more preferably, dimension F is between 130-150 mm, and yet more particularly, about 144 mm. Height dimension C is preferably between 35-70 mm, and more preferably, between 45-55 mm. Still more preferably, dimension C about 50 mm. Dimension D is preferably between 10-20 mm and more preferably about 15 mm. Dimension E is preferably between 10-30 mm and, more preferably, about 16.5 mm. Given the most preferred dimensions, an animal treat delivery system 600 formed of nylon will have a weight (exclusive of animal digestible treats 120) of about 181 grams.

Figure 20:
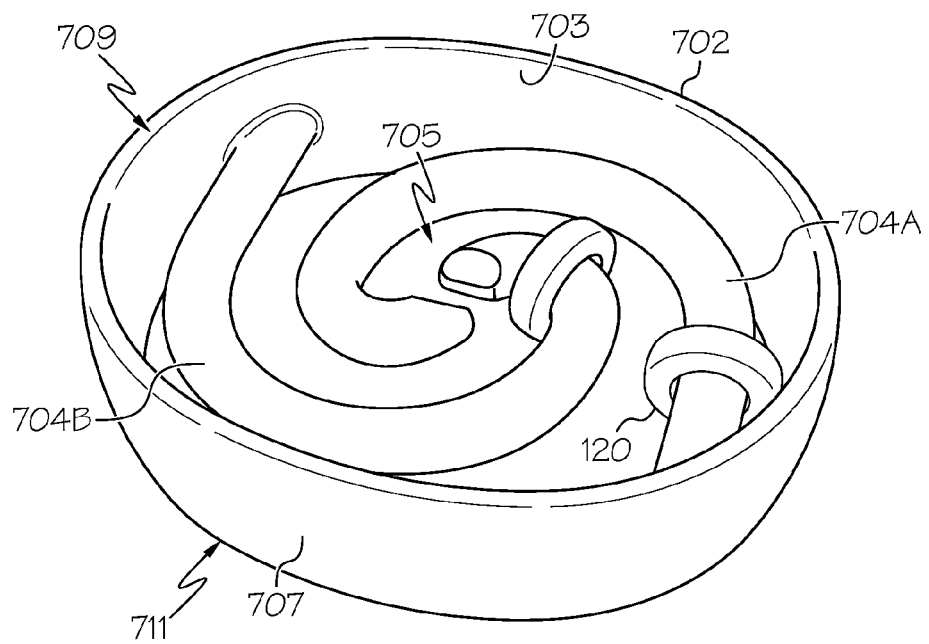
FIG. 20 is a perspective view of an animal treat delivery system (having a generally oval shape) that includes a frame (with a wall that does not include any holes) and a rod that is configured to retain one or more animal digestible treats in accordance with another embodiment.
Figure 21:
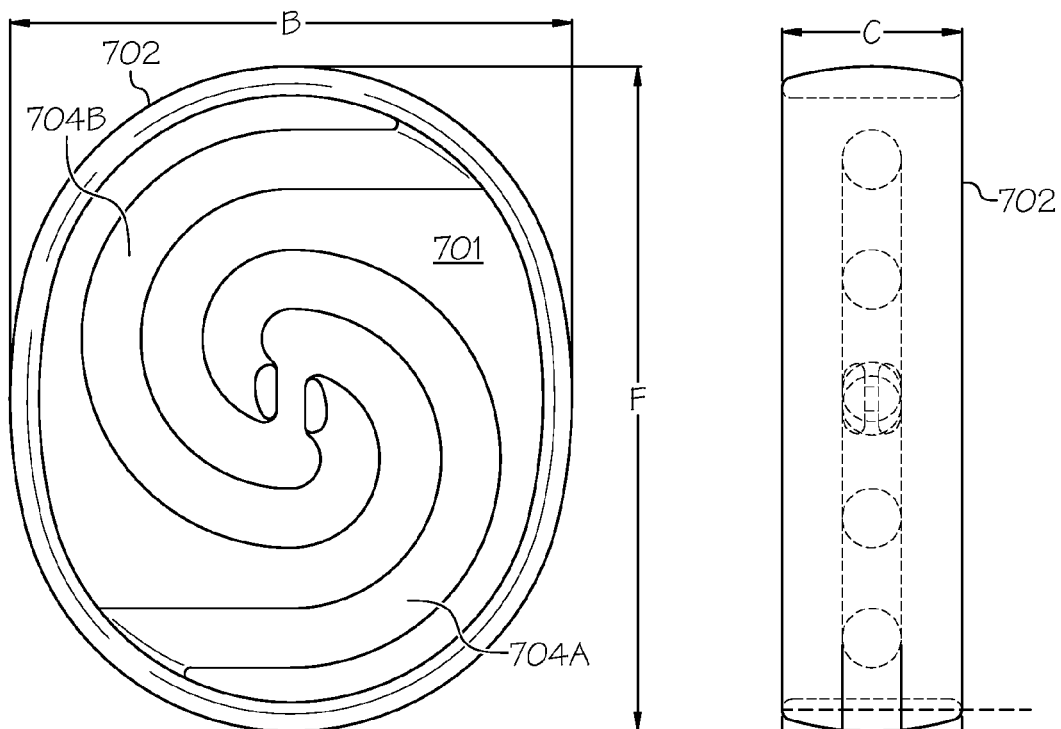
FIG. 21 is a top view of the animal treat delivery system of FIG. 20 further illustrating the rod, which includes a gap sized to facilitate loading animal digestible treats on two free ends of the rod.
Figure 22:
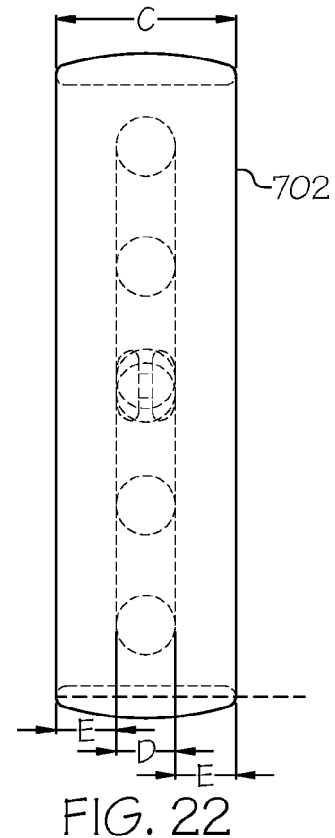
FIG. 22 is a side view of the animal treat delivery system of FIG. 21.

Referring now to FIGS. 20-22, an animal treat delivery system 700 is illustrated that is configured according to still another embodiment. In FIGS. 20-22, reference numerals corresponding to those utilized in FIGS. 1-19 are employed to identify features corresponding to the previously described animal treat delivery systems, with the exception that the reference numerals employed in FIGS. 20-22 begin with the numeral "7". Animal treat delivery system 700, which can be made of the same or similar material and of the same or similar thickness as the previously described animal treat delivery systems, includes a frame 702 having a continuous wall enclosing or bounding an area 701 and a sinuous rod 704 supported within area 701 by an interior surface 703 of the continuous wall at a position intermediate top 709 and bottom 711 of the continuous wall. Frame 702 has an overall shape that is generally oval or curved.

As illustrated in FIGS. 21 and 22, frame 702 is characterized by length dimension B, a width dimension F, height dimension C, rod dimension D and rod spacing dimension E. When animal treat delivery system 700 is intended for use by dogs the following exemplary dimensions may be employed. Length dimension B may be between 100-180 mm, and more preferably, between 120-160 mm. Still more preferably, dimension B is between 130-150 mm, and yet more particularly, about 141 mm. Width dimension F may be between 120-220 mm, and more preferably, between 140-200 mm. Still more preferably, dimension F is between 160-180 mm, and yet more particularly, about 167 mm. Height dimension C is preferably between 35-70 mm, and more preferably, between 45-55 mm. Still more preferably, dimension C about 45 mm. Dimension D is preferably between 10-20 mm and more preferably about 15 mm. Dimension E is preferably between 10-30 mm and, more preferably, about 16.5 mm. Given the most preferred dimensions, an animal treat delivery system 700 formed of nylon will have a weight (exclusive of animal digestible treats 120) of about 210 grams.

Figure 23:
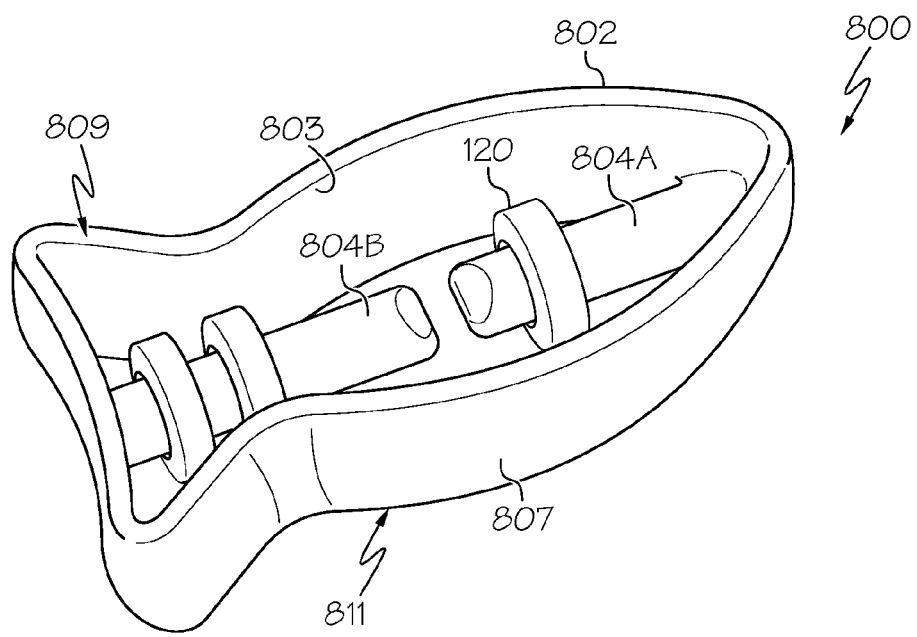
FIG. 23 is a perspective view of an animal treat delivery system (having a fish shape) that includes a frame (with a wall that does not include any holes) and a rod that is configured to retain one or more animal digestible treats in accordance with another embodiment.
Figure 24:
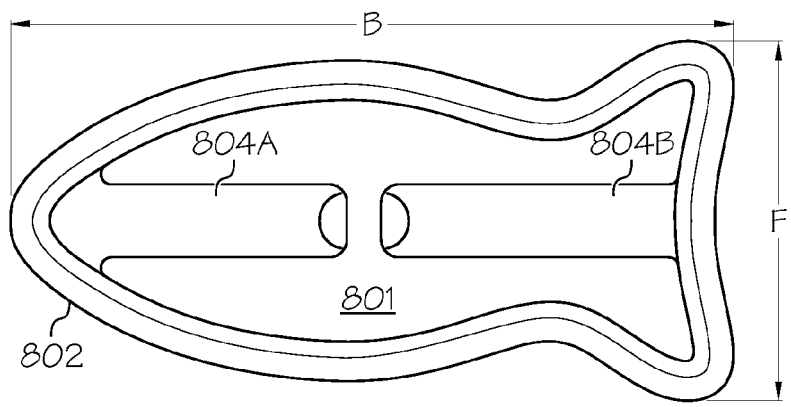
FIG. 24 is a top view of the animal treat delivery system of FIG. 23 further illustrating the rod, which includes a gap sized to facilitate loading animal digestible treats on two free ends of the rod.
Figure 25:
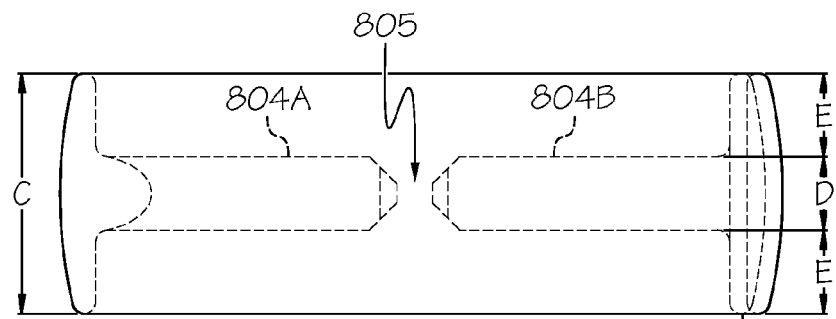
FIG. 25 is a side view of the animal treat delivery system of FIG. 24.

With reference to FIGS. 23-25, an animal treat delivery system 800 is illustrated that is configured according to another embodiment. In FIGS. 23-25, reference numerals corresponding to those utilized in FIGS. 1-22 are employed to identify features corresponding to the previously described animal treat delivery systems, with the exception that the reference numerals employed in FIGS. 23-25 begin with the numeral "8". Animal treat delivery system 800, which can be made of the same or similar material and of the same or similar thickness as the previously described animal treat delivery systems, includes a frame 802 having a continuous wall enclosing or bounding an area 801 and a straight rod 804 supported within area 801 by an interior surface 803 of the continuous wall at a position intermediate top 809 and bottom 811 of the continuous wall. Frame 802 has an overall shape of a fish.

As shown in FIGS. 24 and 25, frame 802 is characterized by length dimension B, a width dimension F, height dimension C, rod dimension D and rod spacing dimension E. When animal treat delivery system 800 is intended for use by dogs the following exemplary dimensions may be employed. Length dimension B may be between 100-200 mm, and more preferably, between 125-175 mm. Still more preferably, dimension B is between 140-160 mm, and yet more particularly, about 146 mm. Width dimension F may be between 50-100 mm, and more preferably, between 65-85 mm. Still more preferably, dimension F is between 70-80 mm, and yet more particularly, about 73 mm. Height dimension C is preferably between 35-70 mm, and more preferably, between 45-55 mm. Still more preferably, dimension C about 48 mm. Dimension D is preferably between 10-20 mm and more preferably about 15 mm. Dimension E is preferably between 10-30 mm and, more preferably, about 17.5 mm. Given the most preferred dimensions, an animal treat delivery system 800 formed of nylon will have a weight (exclusive of animal digestible treats 120) of about 141 grams.

Figure 26:
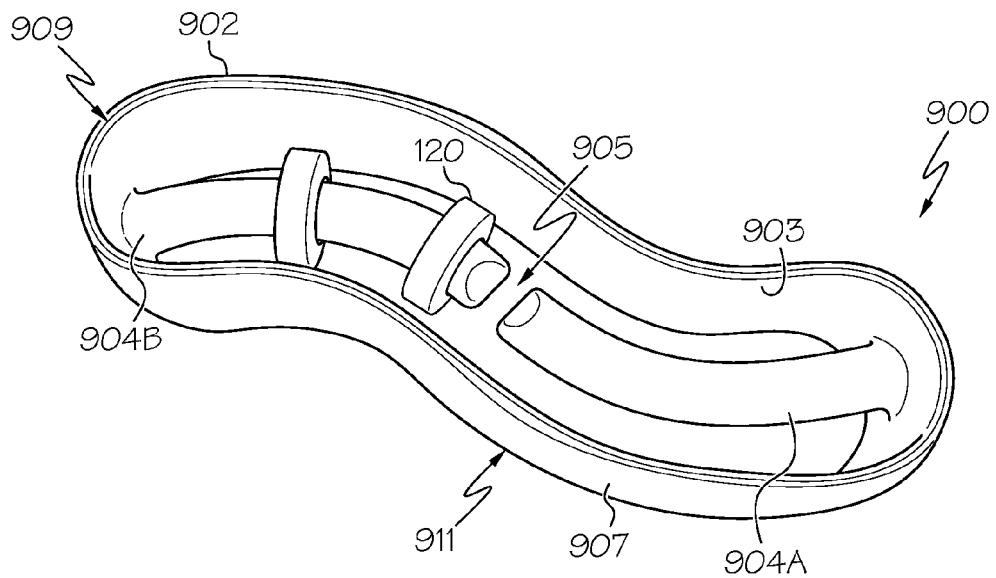
FIG. 26 is a perspective view of an animal treat delivery system (having a squiggle shape) that includes a frame (with a wall that does not include any holes) and a rod that is configured to retain one or more animal digestible treats in accordance with another embodiment.
Figure 27:
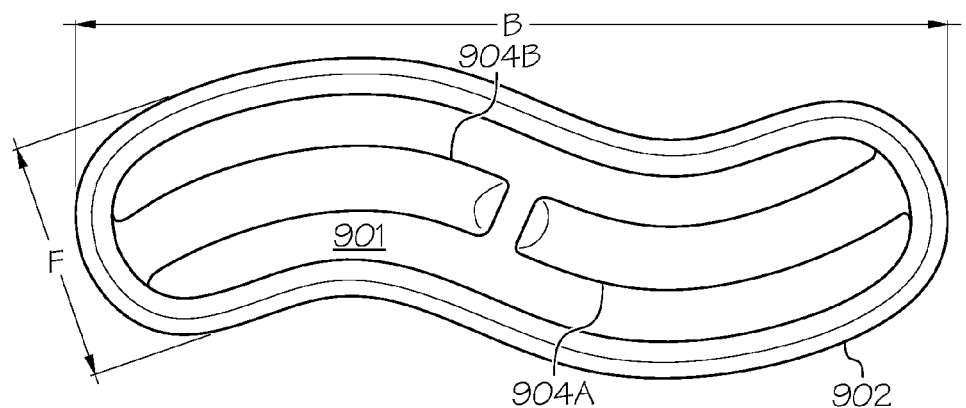
FIG. 27 is a top view of the animal treat delivery system of FIG. 26 further illustrating the rod, which includes a gap sized to facilitate loading animal digestible treats on two free ends of the rod.
Figure 28:
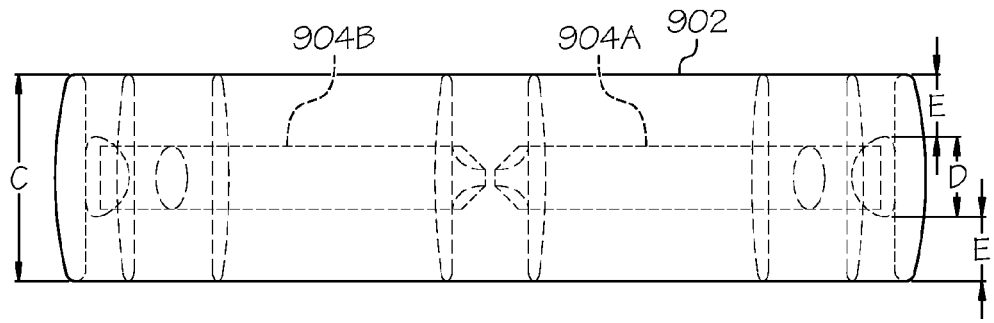
FIG. 28 is a side view of the animal treat delivery system of FIG. 27.

With reference to FIGS. 26-28, an animal treat delivery system 900 is illustrated that is configured according to another embodiment of the present disclosure. In FIGS. 26-28, reference numerals corresponding to those utilized in FIGS. 1-25 are employed to identify features corresponding to the previously described animal treat delivery systems, with the exception that the reference numerals employed in FIGS. 26-28 begin with the numeral "9". Animal treat delivery system 900, which can be made of the same or similar material and of the same or similar thickness as the previously described animal treat delivery systems, includes a frame 902 having a continuous wall enclosing or bounding an area 901 and a sinuous rod 904 supported within area 901 by an interior surface 903 of the continuous wall at a position intermediate top 909 and bottom 911 of the continuous wall. Frame 902 has an overall shape that is generally suggestive of a sausage or squiggle.

As illustrated in FIGS. 27 and 28, frame 902 is characterized by length dimension B, a width dimension F, height dimension C, rod dimension D and rod spacing dimension E. When animal treat delivery system 700 is intended for use by dogs the following exemplary dimensions may be employed. Length dimension B may be between 150-250 mm, and more preferably, between 175-225 mm. Still more preferably, dimension B is between 190-210 mm, and yet more particularly, about 206 mm. Width dimension F may be between 40-80 mm, and more preferably, between 50-70 mm. Still more preferably, dimension F is about 56 mm. Height dimension C is preferably between 35-70 mm, and more preferably, between 45-55 mm. Still more preferably, dimension C about 48 mm. Dimension D is preferably between 10-20 mm and more preferably about 15 mm. Dimension E is preferably between 10-30 mm and, more preferably, about 17.5 mm. Given the most preferred dimensions, an animal treat delivery system 900 formed of nylon will have a weight (exclusive of animal digestible treats 120) of about 179 grams.

Animal treat delivery systems as described herein may be manufactured by injecting a material (e.g., nylon) into a mold. In various embodiments, the mold is configured to form a animal treat delivery system that includes a frame and a rod. In one or more embodiments, the frame of the animal treat delivery system has a wall generally enclosing or bounding an area. The wall has an interior surface, an exterior surface, a top, and a bottom. In various embodiments, the rod of the animal treat delivery system is supported within the area by the interior surface of the wall at a position intermediate the top and the bottom of the wall and has at least one free end. Following the injection of the material into the mold, the injected material is cured. The animal treat delivery system is then removed from the mold subsequent to the curing.

In use, a human will load one or more animal digestible treats onto the rod(s) of the animal treat delivery system and provide the animal treat delivery system to an animal. The animal will then lick or gnaw the animal digestible treat(s) until the animal digestible treats are consumed and/or fragmented and release from the rod(s).

While the present invention has been particularly shown as described with reference to one or more preferred embodiments, it will be understood by those skilled in the art that various changes in form and detail may be made therein without departing from the spirit and scope of the invention. For example, although the present invention has been described with reference to various embodiments of an animal treat delivery system, the present invention as described may also be embodied in other useful articles, such as containers, pet toys, and food dispensers. In addition, it should be appreciated that the dimensions and weights of animal treat delivery systems and their components may differ from those of the disclosed embodiments. With reference to weights and dimensions given herein, the term "about" should be understood as meaning plus or minus ten percent of the stated quantity. It should also be appreciated that in alternative embodiments, the wall of the frame need not be continuous; it is simply preferred if a discontinuity, if present, does not compromise the structural integrity of the frame or provide unfettered access to the animal digestible treats loaded on the rod(s). Moreover, the opening or gap that facilitates loading the animal digestible treats onto a rod of a animal treat delivery system need not be in the rod itself, but could alternatively or additionally be formed in the animal digestible treats. Finally, although specific embodiments suitable for use by dogs have been disclosed, it should be appreciated that the disclosed animal treat delivery systems could be employed to deliver treats to animals other than dogs.

What is claimed is:

1. An animal treat delivery system, comprising:
    a frame having a wall generally bounding an area, wherein the wall has an interior surface, an exterior surface, a top, and a bottom;
    a rod supported within the area by the interior surface of the wall at a position intermediate the top and the bottom of the wall, wherein the rod has at least one free end; and
    one or more animal digestible treats each including a hole that is sized to allow the treats to be slidably received on the rod at the at least one free end.

2. The system of claim 1, wherein the frame and the rod are molded from a nylon material.

3. The system of claim 1, wherein the frame is open at one of the top and the bottom.

4. The system of claim 3, wherein the frame is open at both of the top and the bottom.

5. The system of claim 1, wherein the wall is shaped in one of the following forms: a donut or tire, a light bulb, a bone, a rectangle, a square, a horseshoe, a jack, an oval, a circle, a fish, and a squiggle.

6. The system of claim 1, wherein a diameter of the rod is about fifteen millimeters, a height of the wall is between about forty-five to fifty-seven millimeters, and an outer diameter of the treats is about thirty-five millimeters.

7. The system of claim 1, wherein the rod has two free ends.

8. The system of claim 1, wherein the rod is centrally positioned between the top and the bottom.

9. The system of claim 1, wherein the frame and the rod combined weigh between about one-hundred forty and two-hundred ten grams.

10. The system of claim 1, wherein the frame is a unitary frame.

11. The system of claim 1, wherein the frame is open at at least one of the top and the bottom over all of the area to permit animal access to all of the area.

12. The system of claim 1, wherein the frame and the rod are integrally molded from a nylon material.

13. The system of claim 1, wherein the rod is a fixed rod.

14. A pet toy, comprising:
    a frame having a continuous wall bounding an area, wherein the continuous wall has an interior surface, an exterior surface, a top, and a bottom;
    a rod supported within the area by the interior surface of the wall at a position intermediate the top and the bottom of the continuous wall, wherein the rod has two or more free ends; and
    one or more animal digestible treats each including a hole that is sized to allow the treats to be slidably received on the rod at the two or more free ends.

15. The toy of claim 14, wherein the frame and the rod are molded from a nylon material.

16. The toy of claim 14, wherein the continuous wall has at least one opening.

17. The toy of claim 14, wherein the frame is open at one of the top and the bottom.

18. The toy of claim 17, wherein the frame is open at both the top and the bottom.

19. The toy of claim 14, wherein a diameter of the rod is about fifteen millimeters, a height of the continuous wall is between about forty-five to fifty-seven millimeters, and an outer diameter of the treats is about thirty-five millimeters.

20. The toy of claim 14, wherein the rod is centrally positioned between the top and the bottom.

21. A method of using a pet toy configured to function as an animal treat delivery system, the method comprising:
    providing a pet toy, including:
        a frame having a wall generally bounding an area, wherein the wall has an interior surface, an exterior surface, a top, and a bottom; and
        a rod supported within the area by the interior surface of the wall at a position intermediate the top and the bottom of the wall;
    loading one or more animal digestible treats on the rod; and
    providing the pet toy with the one or more animal digestible treats loaded on the rod to an animal.

* * * * *